United States Patent
Deavers

[11] Patent Number: 6,044,352
[45] Date of Patent: Mar. 28, 2000

[54] METHOD AND SYSTEM FOR PROCESSING AND RECORDING THE TRANSACTIONS IN A MEDICAL SAVINGS FUND ACCOUNT

[76] Inventor: Karl Deavers, 15 Quail Hill Rd., Lloyd Harbor, N.Y. 11743

[21] Appl. No.: 08/584,898

[22] Filed: Jan. 11, 1996

[51] Int. Cl.[7] .................................................. G06F 19/00
[52] U.S. Cl. .................................................. 705/4; 705/1
[58] Field of Search .................... 705/2, 3, 4; 283/54, 283/900

[56] References Cited

U.S. PATENT DOCUMENTS

| | | |
|---|---|---|
| 4,491,725 | 1/1985 | Pritchard .................................. 235/375 |
| 4,674,044 | 6/1987 | Kalmus et al. . |
| 4,700,297 | 10/1987 | Hagel, Sr. et al. . |
| 4,774,663 | 9/1988 | Musmanno et al. . |
| 5,239,462 | 8/1993 | Jones et al. . |
| 5,253,167 | 10/1993 | Yoshida et al. . |
| 5,258,908 | 11/1993 | Hartheimer et al. . |
| 5,265,007 | 11/1993 | Barnhard, Jr. et al. . |
| 5,270,922 | 12/1993 | Higgins . |
| 5,285,384 | 2/1994 | Gineris . |
| 5,287,268 | 2/1994 | McCarthy . |
| 5,291,398 | 3/1994 | Hagan . |
| 5,297,026 | 3/1994 | Hoffman . |
| 5,297,032 | 3/1994 | Trojan et al. . |
| 5,301,105 | 4/1994 | Cummings, Jr. ............................ 705/3 |
| 5,305,200 | 4/1994 | Hartheimer et al. . |
| 5,457,305 | 10/1995 | Akel et al. . |
| 5,619,991 | 4/1997 | Sloane .................................... 128/630 |

*Primary Examiner*—Frantzy Poinvil
*Attorney, Agent, or Firm*—Roland Plottel

[57] ABSTRACT

Method and system for processing transactional data and monitoring funds invested in money market mutual funds for use in the purchase of health insurance policies and the payment of medical expenses. The method and system permits the establishment of a medical savings account for payment of medical/health insurance premiums and medical/health expenses not covered by the insurance and the efficient record keeping and income production from money not fully utilized for insurance or spent for medical/health services and products.

24 Claims, 12 Drawing Sheets

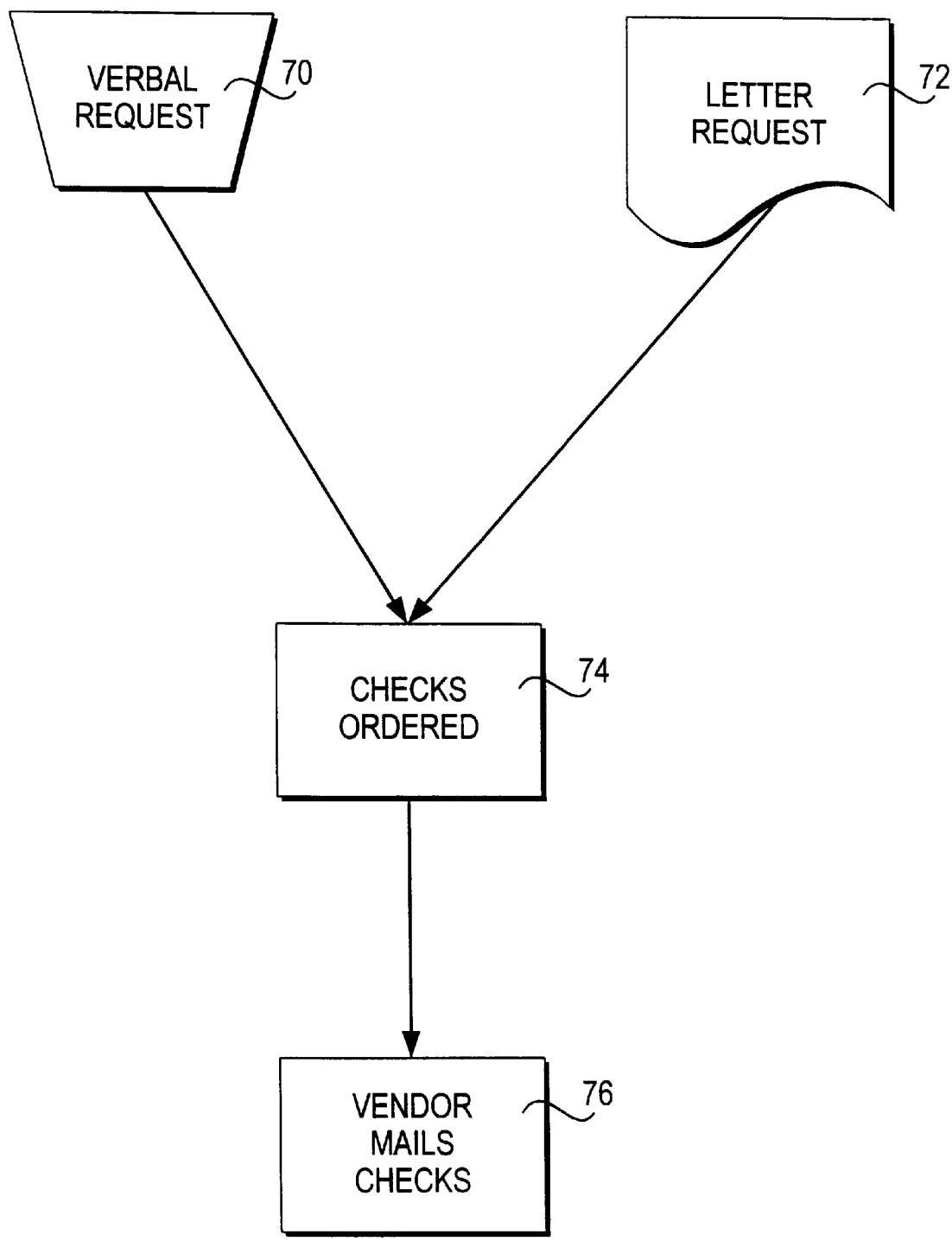
FIG. IF

METHOD AND SYSTEM FOR PROCESSING AND RECORDING THE TRANSACTIONS IN A MEDICAL SAVINGS FUND ACCOUNT

BACKGROUND OF THE INVENTION

The invention relates to a method and a system for processing transactional data and monitoring funds invested in money market mutual funds for use in the purchase of health insurance policies and the payment of medical expenses An objective of the invention is to permit individuals, families and defined groups, such as employers on behalf of their employees, or affiliation groups on behalf of their members, to establish medical savings accounts in an efficient and economical fashion. A medical savings account for the purpose of this invention can be defined as (1) a trust created or organized in the United States for the exclusive benefit of the beneficiaries of the trust if the governing instrument meets the requirements set forth in certain statutory language (including any future amendments thereof) whereby a sum of money may be set aside for the payment of future medical expenses and participants are covered by a high deductible health plan; or (2) a plan under which a sum of money can be set aside and which in part is used to pay for a health insurance policy with a high deductible and the remainder to pay medical expenses (up to the deductible amount), if any, and to retain the balance, if any, for future use or savings or (3) a plan with other variables included in addition to or in combination with features included in (1) or (2). In some cases, a tax benefit may occur with regard to certain state income tax liabilities and legislation is pending relative to Federal income tax benefits which may be available under certain conditions. Legislation is also pending for certain Medicaid participants use of medical savings accounts similar to the plans described herein.

SUMMARY OF THE INVENTION

The invention provides a comprehensive method and system of data processing services available to the participants and an insurance company issuing the health insurance portion of the financial service plan including processing and automation for: payment of insurance premiums; payment of commissions due insurance brokers and agents for the insurance company; checks for payment of medical expenses; dividend income on the sums set aside and available for insurance premiums and medical expenses payable; maintenance of names, addresses, and commissions payable for insurance brokers and agents; notice of amounts necessary to keep insurance policies in effect; and related record keeping matters all in accordance with the requirements of the specific type of plan in effect. Participants will receive monthly statements reporting premiums paid, checks in payment of medical expenses that have cleared the account, dividends received and balances available for future payments of such premiums and medical expenses. The insurance company will receive a monthly report of premiums due together with payment and a listing of policies in force for which payment is made. The insurance company will receive periodic reports of commissions paid or payable and a listing of amounts due or paid to insurance brokers and agents through the service. At the end of each calendar year, or other applicable fiscal year-end, each participant will receive a summary statement showing total insurance premiums paid, total medical expenses paid, total dividends credited to the account and the balance available for future payments of such expenses or available for savings in accordance with applicable tax laws and regulations. The items reported on the summary statement may be used for business reporting, accounting purposes and tax reporting purposes.

In a preferred embodiment, the method and system for processing transactional data and monitoring funds includes identifying and storing insurance policy data, mutual fund transactional data, participant data, insurance broker and agent data and changes in such data as may occur from time to time and issuance of various reports for accounting and income tax purposes.

The system also sums all financial data identified for each participant and classifies such in the proper categories for tax purposes as well as for general accounting purposes. If the sum exceeds the predetermined deductible under the health insurance policy a notice is generated by the system showing that the deductible has been satisfied.

The present invention also relates to a method and a system for processing transactional data and monitoring funds deposited ( invested) in a Medical Savings Fund Account ("MSFA").

BRIEF DESCRIPTION OF THE DRAWINGS

The foregoing and additional features and advantages of the invention will become more readily apparent from the following detailed description of each specific illustrative embodiment thereof, presented hereinbelow in conjunction with each accompanying drawing. In the drawings like elements bear like legends.

FIGS. 1A through 1G are flow charts showing daily method and processing system of the invention.

DESCRIPTION OF THE PREFERRED EMBODIMENTS

The electronic data portion of the system may be implemented by any convenient or conventional digital data processing equipment per se well known to those skilled in the art of processing records or mutual fund transactions and record keeping using any convenient or conventional common business system interconnecting a digital processor, manual data entry terminal apparatus, one or more memories (one of which contains a controlling program), and output signaling device such as a cathode ray tube and printer.

Figure 1A:
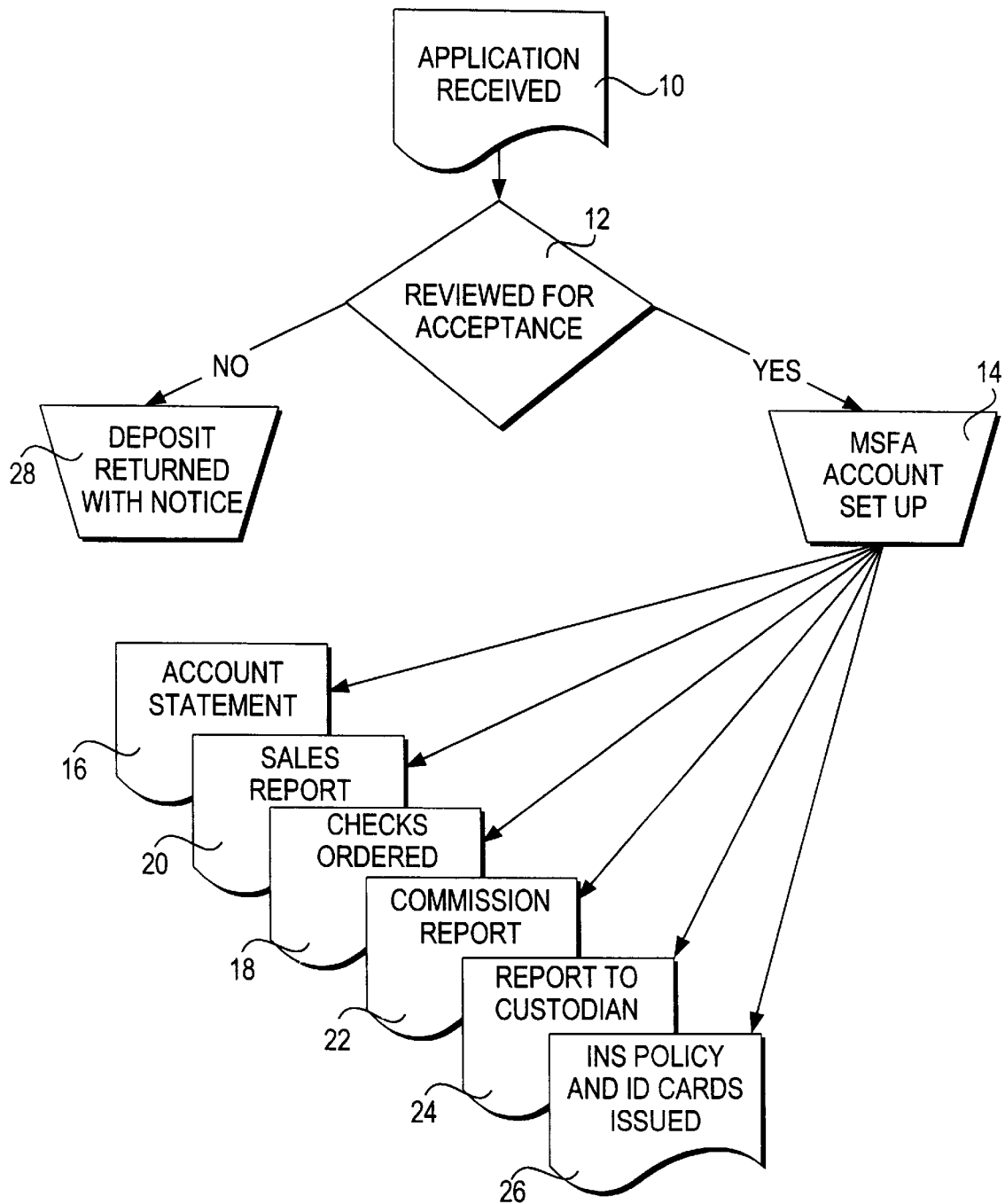

FIG. 1A is a flow chart depicting the method and data processing system for the establishment of a new "Medical Fund Saving Account" (MSFA) in a money market mutual fund and the issuance of a health insurance policy to an individual or family group.

Figure 1B:
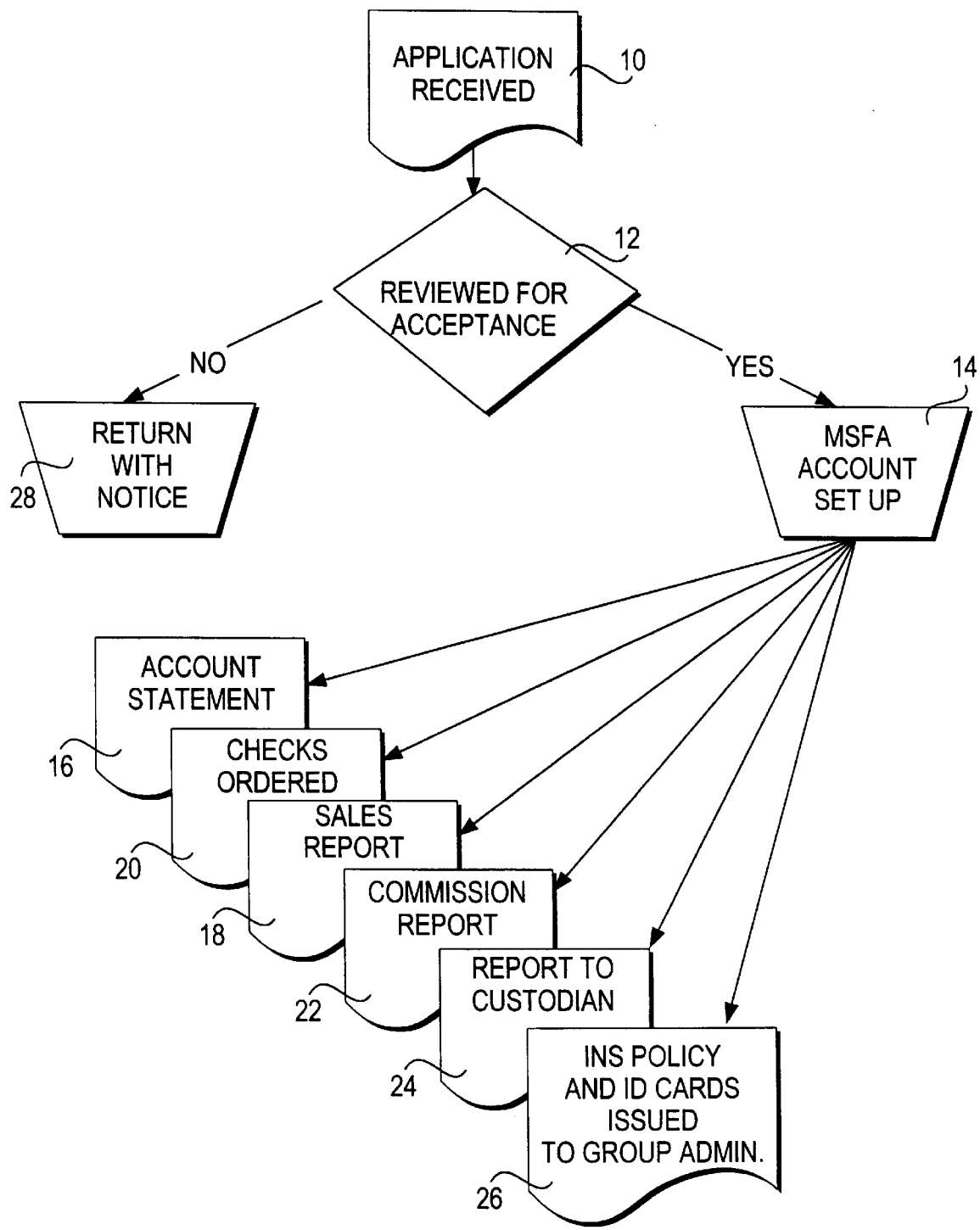

FIG. 1B is a flow chart depicting the method and data processing system for the establishment of a new MSFA in the money market mutual fund and the issuance of a health insurance policy to a specific group such as an employer on behalf of its employees.

Figure 2A:
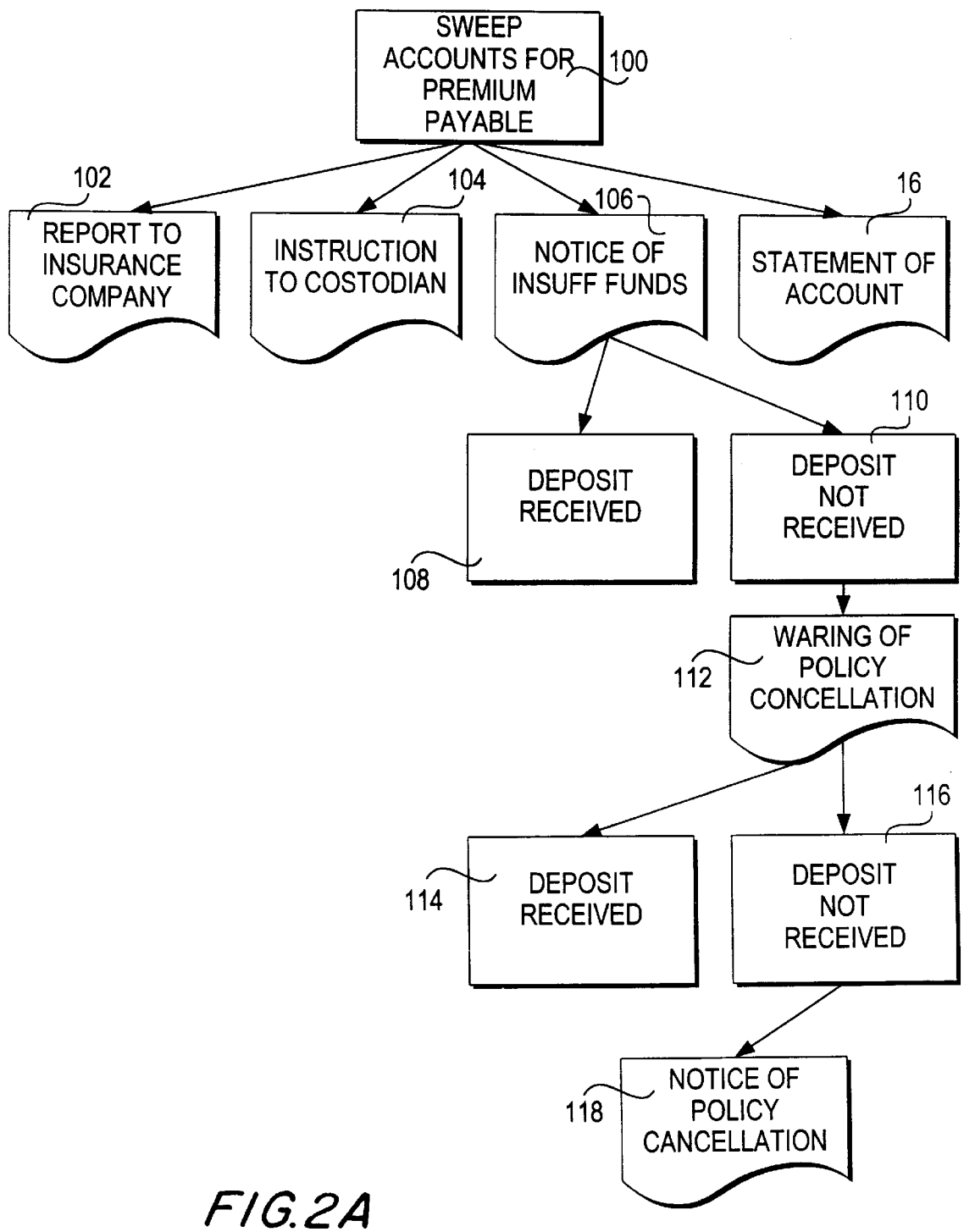
FIGS. 2A through 2C are flow charts showing monthly method and processing system of the invention.
Figure 2B:
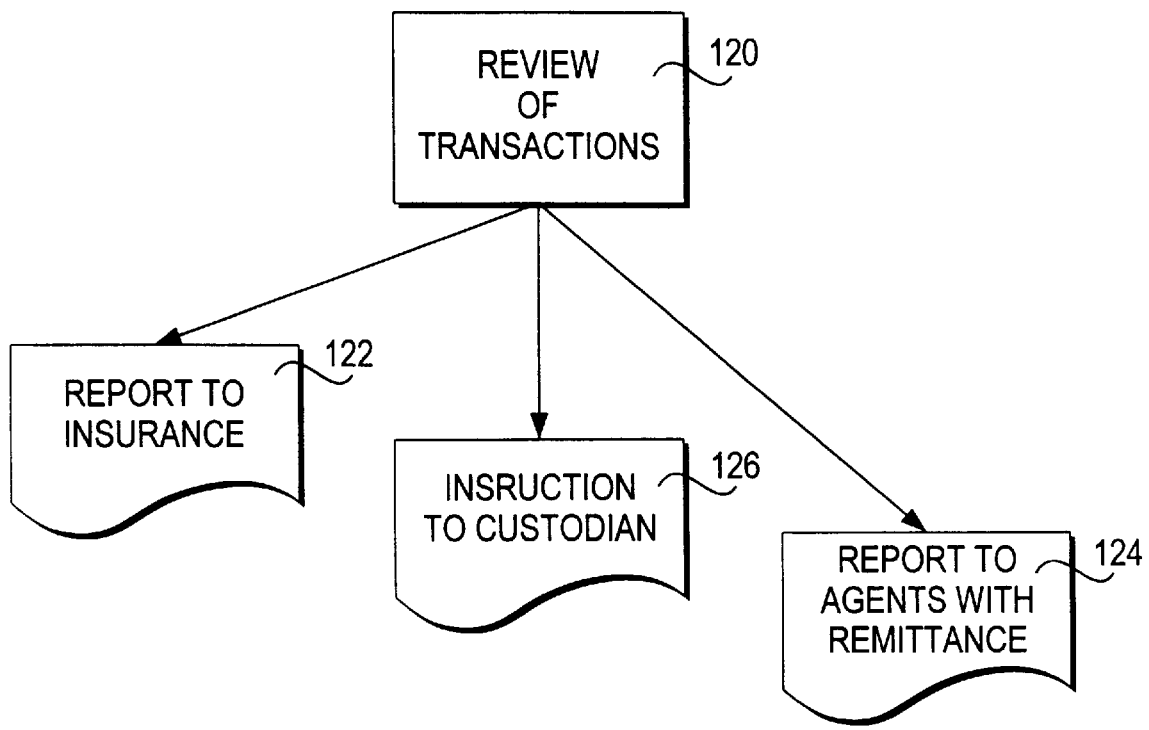

The method and data processing system set forth in FIGS. 1A and 2B are substantially similar except one covers individual and family participants and the other groups.

An example might be helpful. A family participant would initially put $10,000 to open an account. $5,000 would be typically for a one year insurance premium the payments of which would be paid monthly by the custodian or by the fund to an insurance company. The amount of money credited to the family participant's account after payment of the first month's premium would be $416.67, and this money would remain in a mutual fund, which would pay dividend at the end of each month. The family participant's members or beneficiaries, as needed, would have checks, which they could draw on their credit balance to pay for medical expenses the deductible for eye glasses, etc.

Income would come into the participant's account from the dividends on the mutual fund, and money would be paid out for the monthly premiums, and as checks for medical expenses are drawn. At the end of the year, or sooner if needed, the participant should always keep a credit balance of at least $5,000 in the example. Thus, as the amount approaches less than $5,000 there might be some notices. The first notice might be postponed until the end of the first year, provided the checks always left sufficient money in the account for at least, for example, three month's insurance premiums.

A similar financial arrangement would be for an individual account, except the amount would be smaller, e.g. $3,000 for the insurance premium and a total placed into the account of $6,000. For groups, the requirement for a deposit might be somewhat smaller, but this would depend upon the actuarial and marketing plan implemented using the method and system of the invention. The above examples are given for illustration only and do not form part of the invention.

As shown in FIGS. 1A and 1B, upon receipt of an application for the MSFA 10, it is reviewed 12 to determine whether the applicant is within the generally accepted guidelines relative to insurability and if so a new account is established 14. An input clerk sets up the new account with such data as name of insured, address, tax identification number, applicable insurance policy, policy number, signature cards, appropriate agent/agency information, policy date, premium payment dates, and similar information. This function may be automated in part or entirely e.g. by the applicant submitting the required data in machine readable form, or interactively entering the data. The application data may be reviewed for acceptability by machine criteria, e.g. verification of payment, history, etc. A human review however is recommended before any acceptance. If the application is for a group, an identification number is assigned so that the system will have the ability to generate reports showing a summary of all information included in all group member's accounts under that group identification number. The information is stored in appropriate memory banks (not shown) for future use in monitoring the medical savings fund account activity. Each participant has the option to select the type of money market mutual fund as the investment vehicle—taxable or tax-free—that fits within the financial needs of the participant. That election is inputted and the funds received are wired through the Federal Reserve wire system or in check form and is credited to the fund selected by the participant. The system then automatically generates a number of documents including a statement of account 16 to the participant showing the investment transaction, a request to an outside vendor 18 ordering a supply of checks which will be used by the participant for paying future medical expenses in amounts not to exceed the deductible stated in the insurance policy, a sales report 20 to the insurance company, a commission report 22, a report to the fund's custodian bank 24 informing it of the funds available for investment and ultimately permitting the insurance company to issue a new policy and insurance identification cards 26 to the participant(s). Temporary ID insurance cards and policy may be issued 26.

The participants typically would be individuals, families, groups, e.g. an employer covering his employees and a group might also cover an affinity group such as an association of members. Where the participant is an employer or an affinity group, the insurance policy and ID cards issued would go to the employees or members of that group or to a group administrator who would distribute them to the employees or members. Those employees or members of the group might be individuals or families. Also, where the insurance policy and ID card are issued 26, a report would also be generated for the group, i.e. the employer or the affinity group. Some employers might wish to have the ID cards and policies sent directly to the employees. Others might wish to have them sent to the employer or affinity group for distribution.

When an application is received 10, it is entered into the computer and certain internal reviews are made of the application depending upon certain criteria, which may be entered into the computer. One of these criteria is payment. Other criteria are those that would be a standardly established for issuing this type of insurance. If for some reason, the application fails the review for acceptance 12, then a letter is generated 28, which would be a notice, and a return of the check, or if the check had been deposited, then a check would be issued plus any accrued interest or earnings attributed to the money while deposited. The feature of income on money while deposited is discussed in more detail below.

The various original documents used as a foundation for establishing the medical savings fund account are stored for future reference and legal compliance requirements.

Figure 1C:
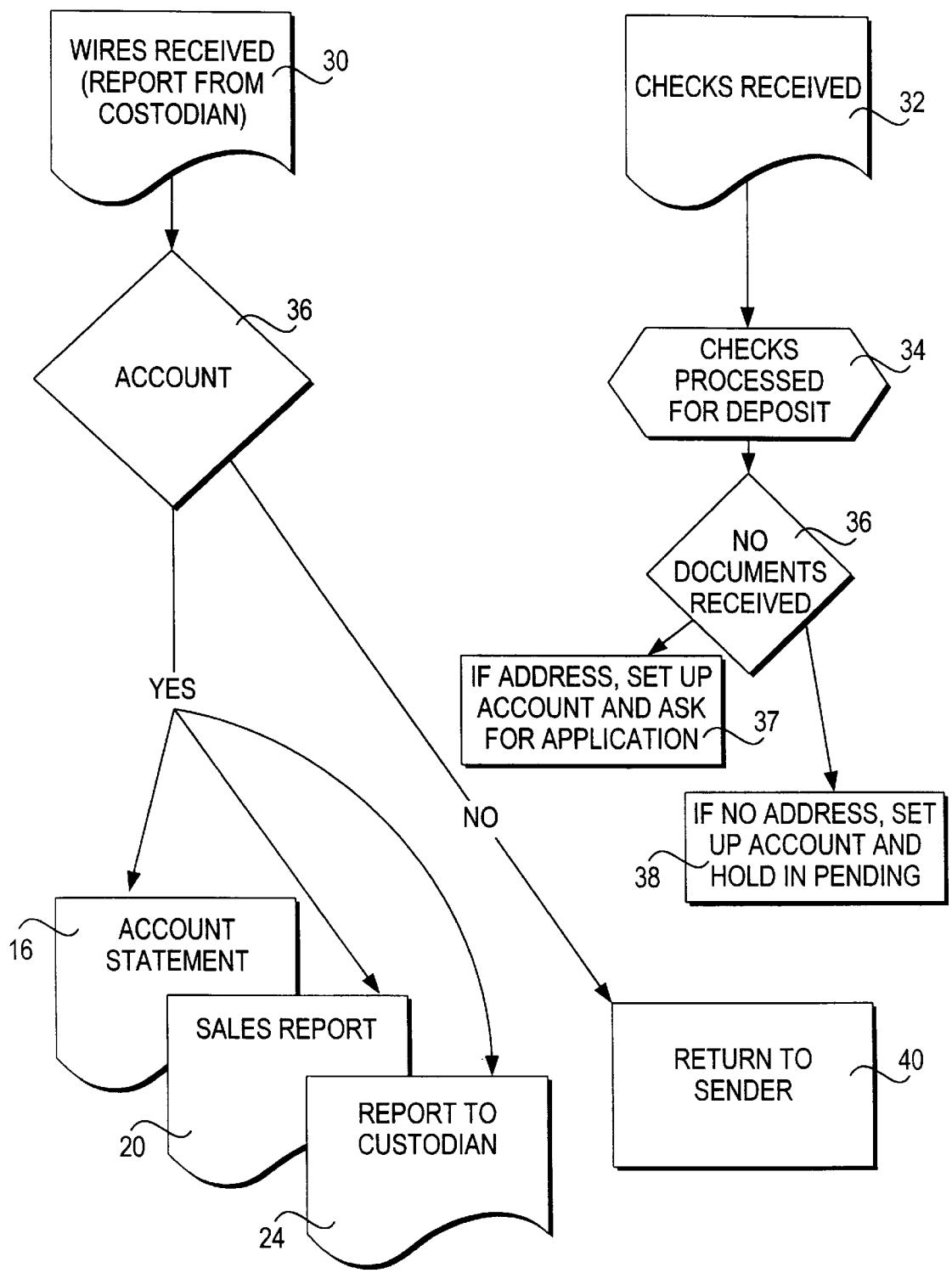

FIG. 1C is a flow chart depicting the method and data processing system for the purchase of shares of a money market mutual fund (deposit to the MSFA) by way of a transfer of monies through the Federal Reserve wire system or with a check remitted by the participant in the MSFA.

Participants of active medical savings fund accounts may add additional balances from time to time for payment of future medical expenses, payment of insurance premiums and savings purposes. Under various state tax rules and regulations currently in effect and proposed Federal legislation (1995) there are and could be limitations placed upon the dollar amounts of investments or deposits for certain types of accounts. It is expected that the method and system of data processing described herein will be able to monitor such limitations once they have been fully defined and if a participant attempts to invest an amount in excess of the permitted limitation, the participant will be notified of such fact before a legal compliance problem arises. The receipt of Federal funds wires through the Federal Reserve system 30 or checks through the mail or otherwise 32 will be processed 34 if not in excess of limitations described above and again reports will be generated for delivery to the participants, custodian and other parties in interest as required for general business and legal compliance purposes.

In the event monies are received in excess of the limitations described above, the monies might be split to permit the maximum permissible to be included in the MSFA with excess placed into a separate account. Suitable reports would be made to the participant submitting such excess amounts.

In the event monies are received for investment or deposit and no account is in being 36, an investment account 38, 40 will be established so that the amounts will begin earning income for the investor immediately. As shown in the flow chart of FIG. 1C no documents have been received at 36, but the money is present. If there is an address on the check, then the money is deposited in an account 37, and an application is sent to the address. If there is no address or identification on the check or payment, then an account is set up 38, and it is held in pending. Subsequently, if an account is opened for the money, which previously arrived, the account is handled in the manner set forth in FIG. 1A. If the account is refused, then the application is denied 28 with notice, and the amount of the money received is returned 28 along with any dividend or interest which accrued while the money was in account 38.

When checks are received 32 and processed 34, or when wire is received 30, verification is made to match them with an account 36, and then verify that the money received and the account is a proper transaction 39. An example of a proper transaction is to pay an insurance premium, or to replenish the account for moneys spent on medical expenses. An example of an improper transaction would be the submission of a payment for a cancelled policy. If the transaction is not proper, then the check is returned to the sender 40, and if it comes through a wire system, then a notice letter is generated, and a check sent to the sender 40.

If the money received matches the account 36, and if it is verified as a proper transaction 39, then data is entered into that account's statement 16 of receipt of the money. If a sales report 20 is needed for the insurance company, it is generated, and a report 24 goes to the custodian.

Figure 1D:
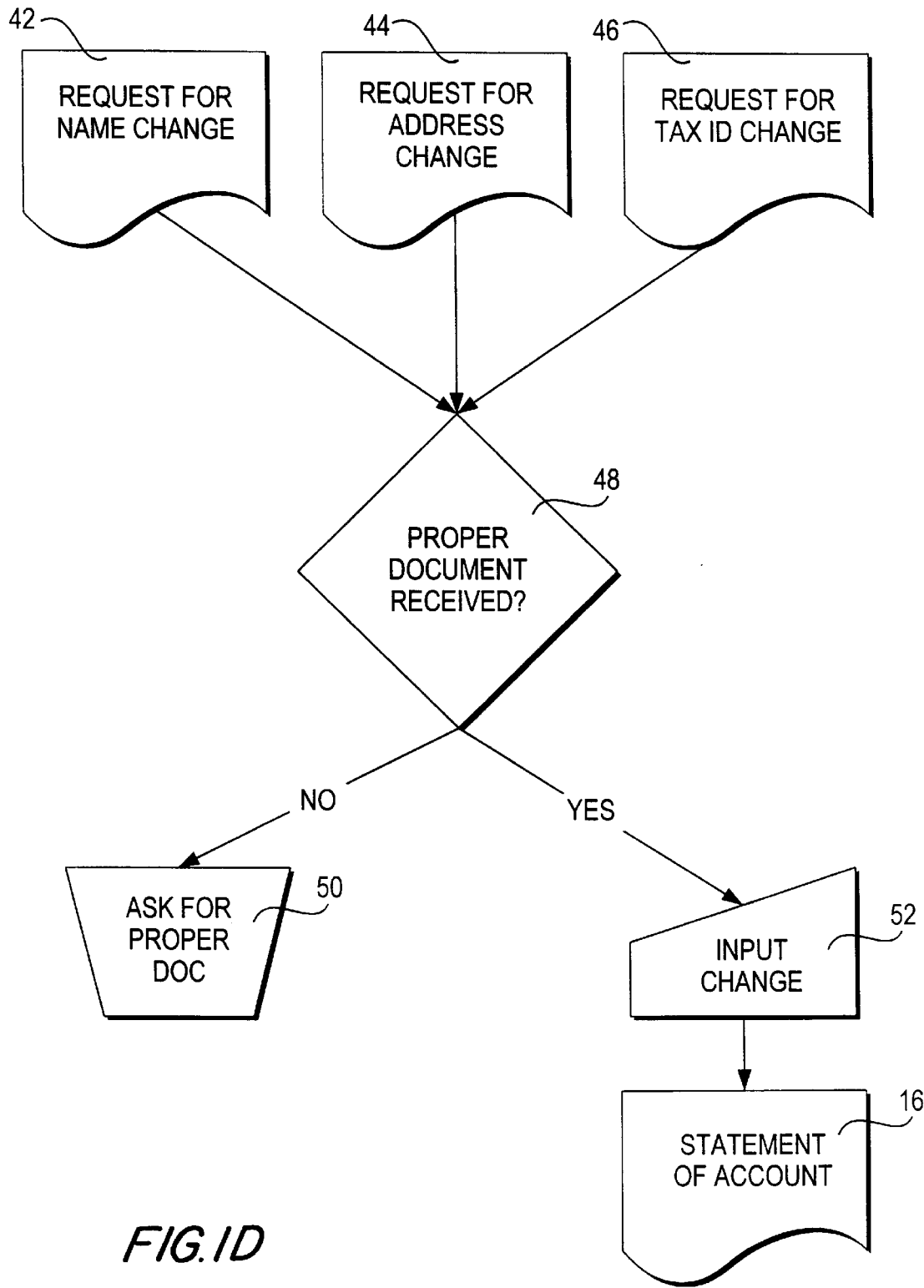

FIG. 1D is a flow chart depicting the method and data processing system for changes of a participant s name, address or tax identification number.

Past experience has shown that approximately twenty percent of American households relocate each year, therefore, procedures must be in place to respond to requests for such changes in order to insure that communications are received timely by the participants. In addition, provision is made for changes in names as a result of marriage, or other reasons, and changes in tax identification numbers which occur occasionally. As shown in FIG. 1D request for name changes 42, request for changes of address 44 and request for tax ID change 46 arrive from participants. Each request must be accompanied by a document 48. This is examined, and if the documentary support does not appear to be correct, then a letter is generated requesting document 50. A routine procedure to follow for change of address is that a notice is sent to the new address of the participant. If it is not returned by the post office within a certain period of time, it may be assumed to be correct. More elaborate routines may be used, and those are well known to those in the security/fraud-avoidance industry. It is envisioned that suitable levels of document verification and checking will be initiated and installed as needed. If the request is accompanied by, and has the proper documentation and verification, then an input change to the data base is made for that account 52, and the change appears on the statement of accounts 16 as well as the other documents, for example insurance policy and ID cards (not shown in FIG. 1D).

Figure 1E:
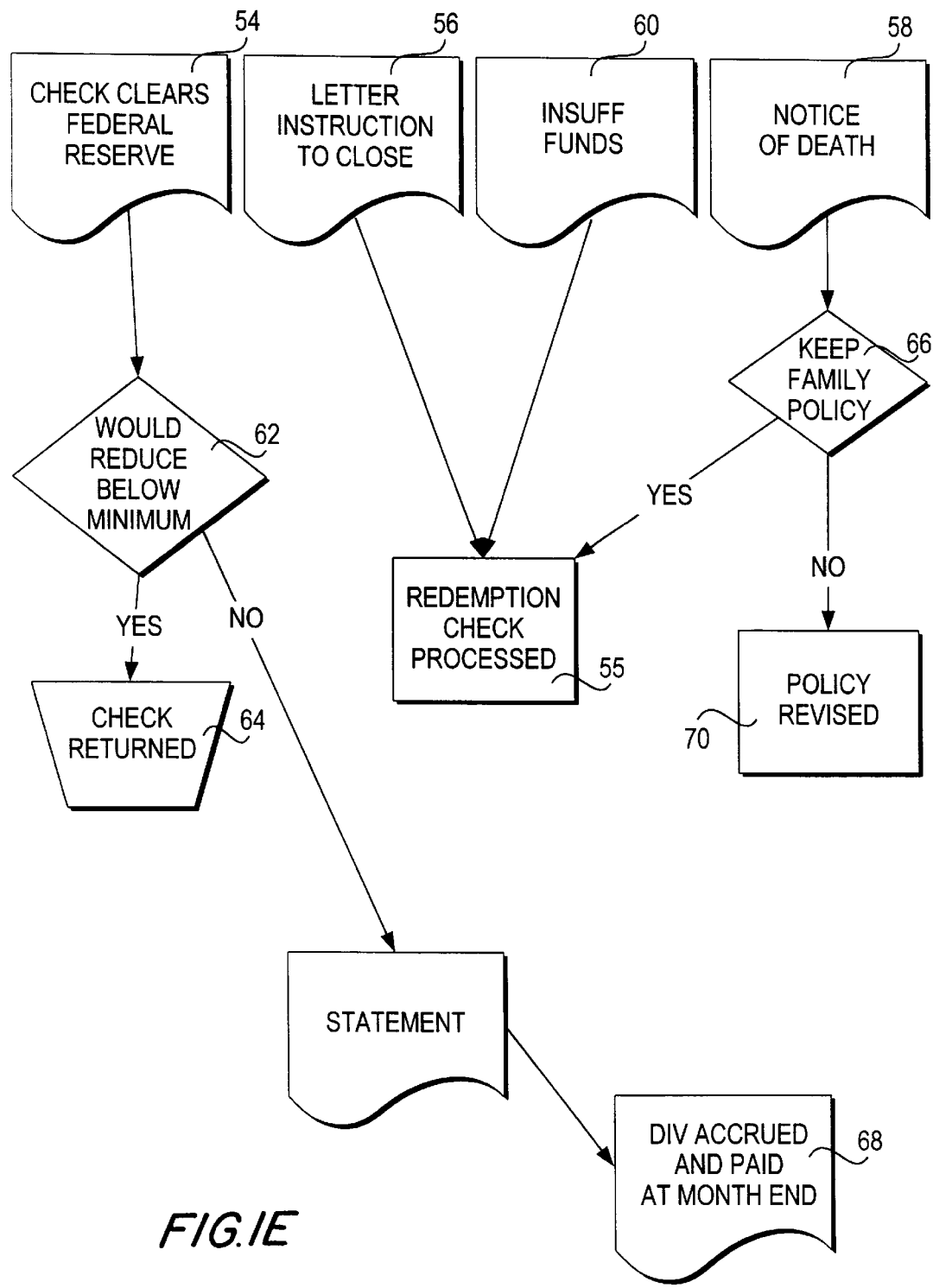

FIG. 1E is a flow chart depicting the method and data processing system for the redemption of shares of the money market mutual fund by use of checks (drafts) drawn by participants on the money market mutual fund account to pay for medical expenses 54; or the issuance of a check 55 upon receipt of instructions from the participant to terminate the MSFA 56, or notification of the death of the participant 58, or due to the financial inability of the participant to continue the MSFA 60.

After a medical savings fund account is opened and a supply of checks 18 is available for use, a participant may begin making payments of medical expenses through the account. The redemption checks (drafts) will clear the Federal Reserve system 54 by way of the money market mutual fund's bank account with a custodian bank. The checks cleared and reported by the custodian bank will be honored (paid) if the system indicates 62 that there is a balance sufficient to pay the check and the that balance remaining after such payment will be sufficient to pay for the next insurance premium(s) due (or in effect, would not fall below an established minimum balance). If it would reduce below the minimum then a notice is generated and the check returned, i.e. refused. This step is extremely important to avoid the inadvertent cancellation of a health insurance policy while a participant is unable to transact business due to illness or other reason. The rejected check (draft) can be resubmitted through the banking system at a later date, once the problem has been communicated and resolved.

The method and system of data processing also provides for redemption by check issued by the money market mutual fund when requested by a participant for any reason to close the account 56, 58, 60, when the balance in the medical savings fund account is insufficient to pay insurance premiums on the appropriate due date and the participant does not response or cannot respond to notices of need for additions funds 60; and in case of death of the participant 58 where a policy covers only that participant or the surviving family members do not elect to continue the account 66. In such cases the account will be terminated, the insurance policy canceled, a redemption check drawn 55 and appropriate reports generated. In the event a dividend is payable after an account has been closed, the dividend will be mailed later 68, e.g. at the end of the month.

Upon receipt of the notice of death 58 of a family plan, there is generated a document requesting to know if the family wishes to keep the policy 66. If the family wishes to keep the policy, then a revised policy is issued, which may include opening a new policy 70.

FIG. 1F is a flow chart depicting the method and data processing system for the issuance of additional supplies of checks requested by participants in the MSFA for use in paying for medical expenses.

As indicated in FIG. 1F, telephone requests 70 and written requests 72 for additional checks will generate an order to the appropriate vendor 74 to print and mail 76 a new supply of checks for the participant's use. Usually the vendor will mail the check directly to the participant, where the participant is an individual or family. Also, it may be mailed to the individual or family under a group unless the group employer or administrator requests the check to be mailed differently.

Figure 1G:
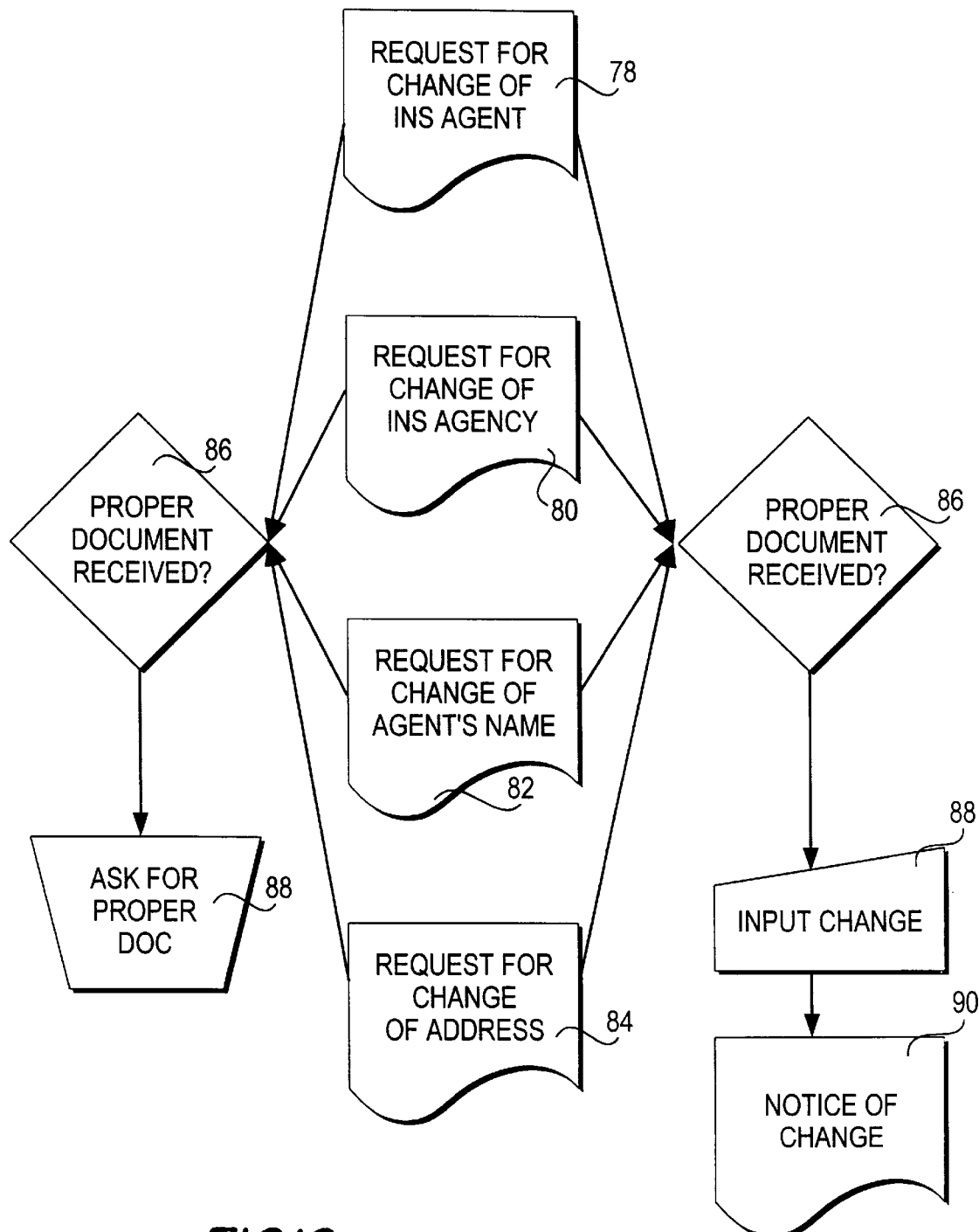

FIG. 1G is a flow chart depicting the method and data processing system for changes of the insurance agent or insurance agency of record and for changes of an agent s name or address.

The method and system of data processing will accommodate a change of the agent and/or agency of record for specific individuals or group policies as may occur from time to times as well as a change in the name or address of such agents or agencies. This feature is imperative in order to be able to maintain records of commissions earned for the sale of policies so that proper payment may be made when due.

As shown in FIG. 1G, request for change of insurance agent 78; for change of request of insurance agency 80;

change of agent's name 82; and request for agent's or agency's change of address 84 arrive. The first question is there proper documentation to support the request for change 86. At the left of the flow chart, the proper documentation has not been received, and the system automatically generates a request for proper documentation 88. When the documentation is received, it is entered. As shown to the right of the flow chart, proper documentation is received and the changes are inputted into the system, and the notice of change is both mailed to the agent or agency requesting the change and is entered into the system for future reports.

FIG. 2A is a flow chart depicting the method and data processing system for collecting and remitting payment of health insurance policy premiums and/or the cancellation of health insurance policies as a result of insufficient funds for the payment of premiums.

In one embodiment, a participant upon opening an account pay a certain sum of money. For example, an individual might pay $6,000 of which $3,000 would be for one year's insurance premium, and $3,000 for medical expenses not covered by the insurance policy to satisfy minimums or deductibles. It is envisioned in one example for there always to be credit balance for an individual to cover three month's premiums. In the example, upon opening the account, the first month's premium, e.g. $250 would be paid to the insurance company, and each subsequent month, the same amount would be payable to the insurance company. The remaining money would be in the money market fund or mutual fund and dividends each month, or from time to time, would be credited to that participant's account. If at any time, the account should fall below three month's premiums, it would be deemed to have insufficient funds. The three month premium amount is variable, but is shown here for purposes of illustration. For a family participant the original money would be, for example, $10,000, of which $5,000 would be a one year insurance policy. Again, for the family policy, $416.67 would be sent to pay for each month's insurance premium, and the credit balance in that account would be invested in a mutual fund, income coming in from the mutual fund, and outlays of money for paying the insurance premium, and for payment of medical expenses which were drawn on the checks. Here again, if at any time, the amount of money remains less than, for example, three month's premiums, the account would be deemed to have insufficient funds. For groups, the group requirements of what is insufficient funds would be determined, and would be quite close to and reflect the make up of the members of the group individual or families. However, some actuarial adjustment or business judgment adjustment might be applied. Further, it is generally considered in the example desirable to have a credit balance of approximately of at least one year's full premiums, and at the end of the year, when the credit balance is not equal to one year's full premiums, a notice may be sent to the participant of each account, which is less than this amount. It will be appreciated that depending upon the circumstances, and the insurance sought, and the medical requirements of each participant, there will be variations from one account to another.

Turning now to FIG. 2A, the method and system of data processing provides for accumulating premiums for payment to the issuer on specific intervals e.g. monthly 100. A report of policies in force for which payment is made will be provided to the insurance issuer 102. The method and system will generate reports to the issuer of policies 102, instructions to the custodian bank 104 to transfer funds in payment of premiums, and statements to participants 16 indicating that premiums have been paid from their medical savings fund accounts. The participants whose balances are below the stated minimums will receive notices 106 of such fact and notices of cancellation if action is not taken to correct the problem by a specified date.

Where the sweep of the data base indicates that an account will have insufficient funds, the notice of insufficient funds is automatically prepared and sent 106. The notice indicates the minimum amount of money due, and the time within which it is to be paid. Subsequently, if within that time period, a deposit is received, it is entered in the normal course as shown by block 108 (and in more detail FIG. 1C). If money is not received either, e.g. from a deposit or mutual fund dividend, within the time period 110, then at the end of the first time period, a warning of policy cancellation is automatically generated and sent 112. This warning sets a second time, and identifies the minimum amount of money required to maintain the insurance policy. Subsequently, if payment is made, and the money is received within this second time period, then as shown in the flow chart element 114, the money is entered in the usual routine as described with regard to FIG. 1C. If at the end of this second time period, the money is not received 116, then a notice of policy cancellation 118 is automatically generated. It is anticipated in the example that insufficient funds would be flagged when there remains in a participant's account including anticipated dividends at least three but not more than four month's insurance premiums. When an account is deemed to be insufficient, checks written on that account will be dishonored, and the remaining funds will be used to pay the last three month's insurance premiums, unless of course, the policy is terminated, in which event a refund is made of any remaining amounts plus any earned dividends or other amount from the mutual fund as shown in FIG. 1E. The time between the notice of insufficient funds 106 including the warning of policy cancellation 112 and the notice of policy cancellation 118 is typically 60 days. This provides a small grace period (not shown). If deposit is received after a notice of policy cancellation and in the grace period the policy and account remain in effect. After the funds in an account are exhausted to pay the last month's insurance premium, the policy will be cancelled. Subsequent attempts by the participant to pay money into the fund, and to have the insurance, should be rejected as shown in FIG. 1C, verification of transaction 38. A participant whose policy has been cancelled would then have to submit a new application and start afresh.

It should be noted that the examples given above and throughout the specification are typical examples. They may vary from state to state depending upon the various requirements and insurance policy laws in various states and also may vary upon commercial and financial considerations and the pools of participants.

FIG. 2B is a flow chart depicting data the method and data processing system for the preparation of sales reports and payments of commissions due to insurance agencies and agents for selling the health insurance policies.

The method and system of data processing provides for the storage and accumulation of sales information relative to specific policies sold by specific agents and or agencies necessary to compute commissions due and payable for such sales. Each month or other specified period, a review is made of such data 120 and a sales report will be generated and commission calculated for each specific person or group noted above. The appropriate report will be generated for the insurance issuer 122 as well as the sales person or group 124. Instructions to the custodian bank 126 to make the required payments will be generated and a check remitted together will the report 124 or wired through the Federal Reserve system, depending on the amount to be paid to a specific payee.

Figure 2C:
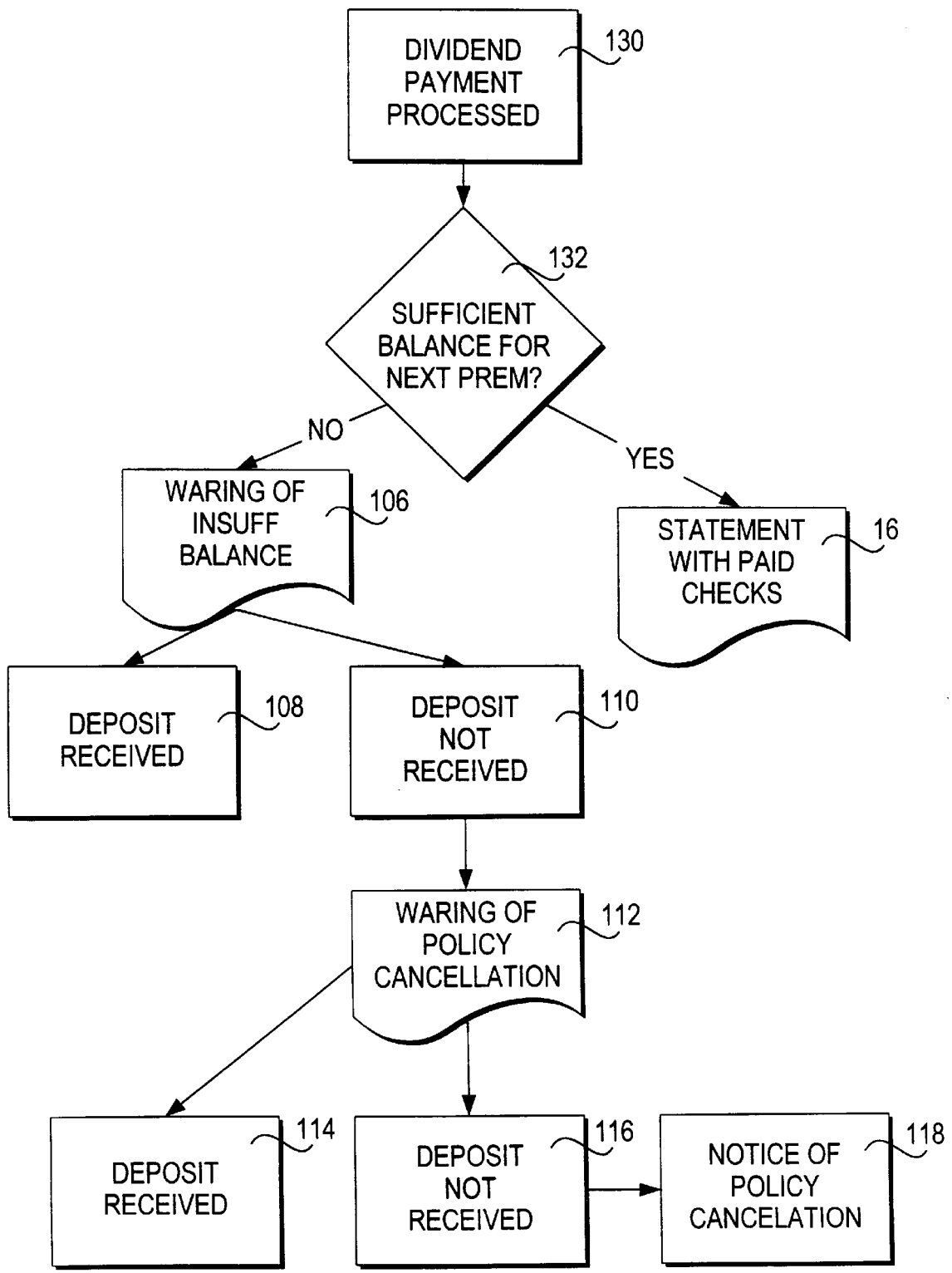

FIG. 2C is a flow chart depicting the method and data processing system for processing and paying the monthly dividend on the money market mutual funds shares as well as producing notices relative to insufficient balances available for the next or subsequent health insurance premiums due and the subsequent cancellation of health insurance policies because of insufficient funds for the payment of premiums.

At the end of each calendar month, the Fund will declare a dividend based on the average assets for that month and paid in the first few days of the following month 130 to each participant's account based on the average monthly balance invested in the fund through the addition of book credit shares added to the participant's MSFA thereby adding additional funds for use in paying premiums and/or medical expenses. After the dividend is credited to the individual participant's account the system will check for sufficient balance 132 and issue a warning 106 to a participant whose account is not sufficient to cover the next premium due and payable. By next premium, it is understood, from the example given, that there should be sufficient funds to cover the next three months' premiums, assuming the premiums are paid monthly. As noted above, different time periods may be used. If there is a sufficient balance, then the account statement 16 issues listing the dividend payments and with the cancelled checks which the participant wrote and which cleared the account for payment of the participant's medical expenses. This statement 16 includes additional items of information besides the dividend payments from the mutual fund. If sufficient funds are not received within a stated time 110, a second warning 112 will be generated to inform the participant that the policy must be canceled if a sufficient deposit has not been received on or before a specific date and the policy will be canceled and a notice issued of such action. The procedure here is similar to what is shown in FIG. 2A and like legends are used. After the second warning 112, if the deposit is not received 116, then a notice of policy cancellation 118 issues. If the deposit is received after the first notice 108 or if the deposit is received 114, after the second notice, then the usual deposit procedures are followed as set forth in FIG. 1C. In FIGS. 2C and 2A, like legend has been used for the insufficient fund first warning, second warning and notice of cancellation, and deposits received and not received.

Figure 3:
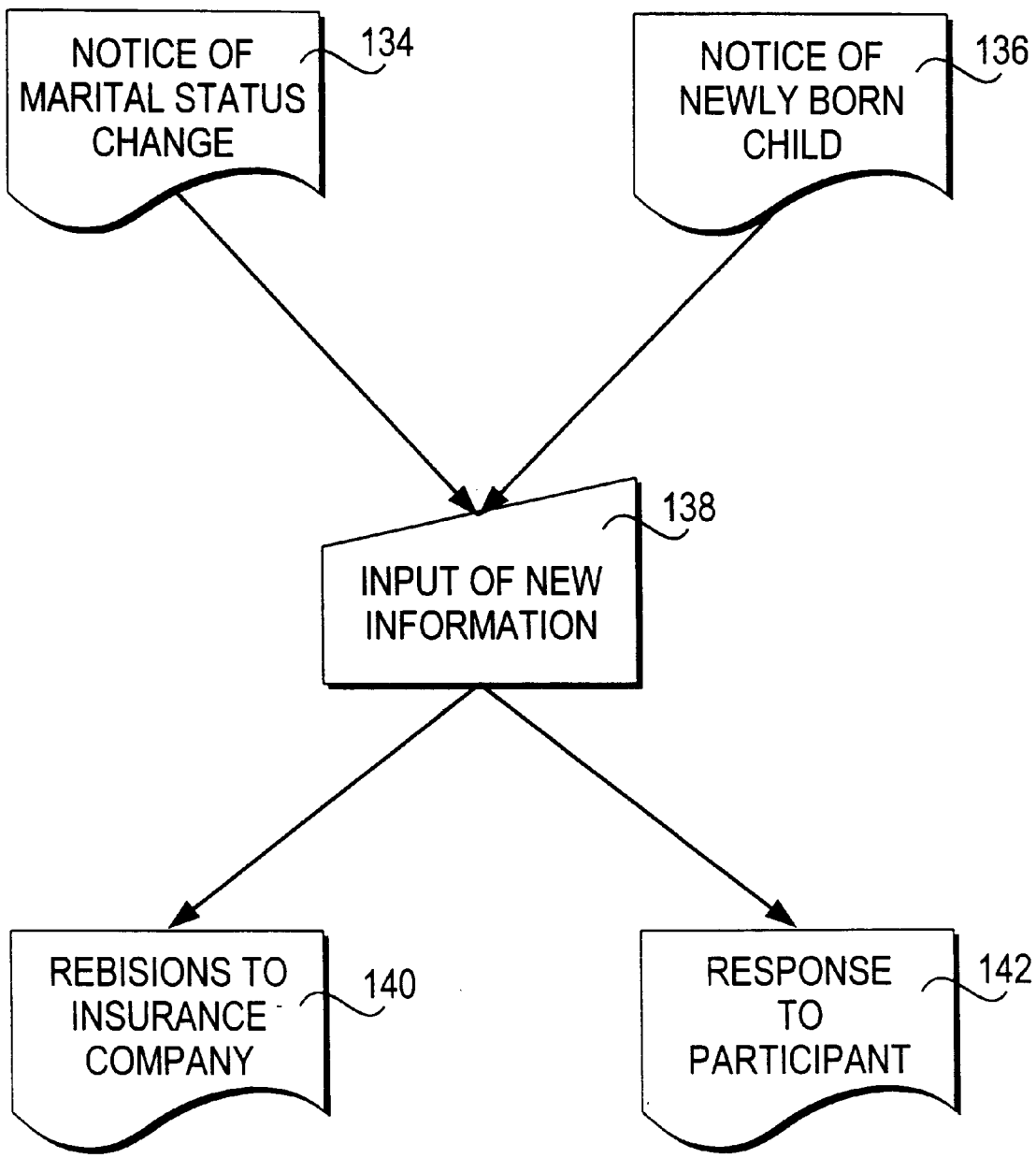
FIG. 3 is a flow chart showing the quarterly method and processing system of the invention.

FIG. 3 is a flow chart depicting the method and data processing system for amending or updating health insurance policy records to include a new family member resulting from the marriage of an insured individual 134, deleting a family member from a policy resulting from a divorce, separation or other similar legal action or adding a new family member as a result of a recent birth or adoption 136. In some instances a change may also require an increase or decrease in the premium payable for the appropriate coverage as amended. Changes are entered 138 and verification, not shown, may be built into the system. A report will be prepared as required for the insurance company s record keeping needs 140. The participant will also receive a communication generated by the system relative to the requested change containing the appropriate information needed by the participant 142.

Figure 4:
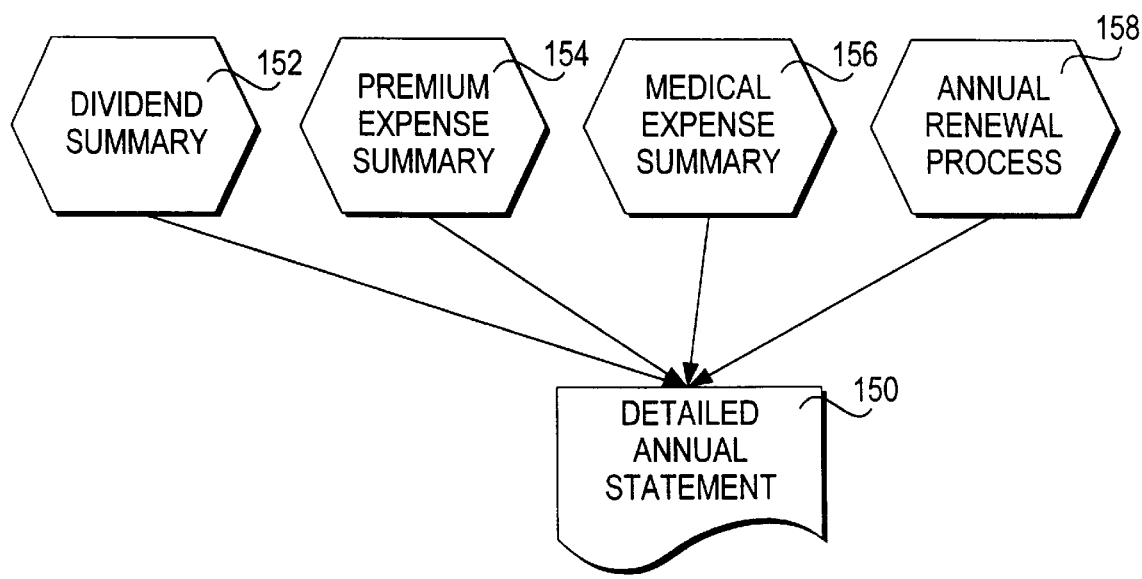
FIG. 4 is a flow chart showing annual method and processing system of the invention.

FIG. 4 is a flow chart depicting the method and data processing system for summarizing total premiums paid, total medical expenses paid, total dividends paid, the year-end balance available for payments of such expense items and year-end information for income tax purposes.

Shortly after the end of each calendar year, the method and system generates and each participant receives a summary statement 150 of all transactions for the preceding calendar year. The statement will show the total income 152, e.g. dividends received and credited to the account for general accounting as well as for tax filing purposes. A total of all insurance premiums 154 deducted from the account and paid to the insurer will be reported. The total medical expenses paid 156 by redemption checks (drafts) paid through the MSFA will also be shown. The checks cleared through the account will be returned to each participant for tax reporting and accounting purposes as evidence of payment. If the participant is part of a specific group, additional information may be required for the employer or other administrator and in some cases, other information and documents may be required as part of the annual renewal process 158 depending upon the needs of the specific group.

The above examples are illustrations of various embodiments of the invention. The invention further includes modifications and variations and further developments of what has been described. For example, if for regulatory or other reasons, or governmental reasons, there is a dollar cap on the amount of money that can be paid with certain tax advantages into a medical insurance fund, and a participant wishes to put in a larger amount or make a prepayment in a single lump sum which would produce larger amounts, then the method and the system of the invention would identify the regulatory or tax advantage and segregate the moneys put in into a first mutual fund account, which would contain the maximum permitted by regulation or law and a second mutual fund from which money would be periodically transferred as the amount in the first account would fall below the maximum permitted by regulation or law. Both accounts of course would be income bearing. One or both of the accounts might be tax free income.

It is envisioned that the method and the system of the invention would be most efficient operating with about 100,000 participant's accounts. For ease of administration, the method and system of the invention might be batched or divided into different funds each time 100,000 accounts were reached. The number 100,000 is not obligatory, and funds might be 200,000 or 300,000. Smaller funds in the size up to 10,000 would probably be initially viable.

A typical practical organization and implementation of the method and system might be implemented by a service organization. At the present time, there is available various commercial service organizations that can comfortably and conveniently handle large numbers of the participant's accounts as described herein. For example, Boston Financial Data Services in Boston, Mass.; or Bank of New York in New York City. The custodian may be a bank. There are a number of commercial organizations offering custodial services. For example, State Street in Boston, Massachusetts. The Bank of New York in New York City, in addition to providing the service organization, also provides the custodian bank services. The custodian bank would typically hold the money and securities, for the mutual fund. A money market fund typically would make recommendations on what investments to buy and sell and suggestions on management of cash and balances.

Under current procedures, in the United States, checks drawn by a participant on his account to, for example, pay a medical expense would clear the Federal Reserve and a list of checks would be presented to the custodian bank the day after presented to the Federal Reserve. A list of such checks is then wired to the custodian bank, who would wire the list of checks to the service organization, who would then verify that the checks drawn on that account are valid, as shown for example in FIG. 1E. If any check is to be dishonored, the service organization would advise the custodian bank who would then in turn advise the Federal Reserve. The submission to the custodian bank and the service organization review and refusal or dishonor of any check is typically done in about a few hours during the morning on the day in which it is received from the Federal Reserve.

The money market mutual fund may be managed by any convenient or conventional mutual fund manager. There are a very large number of them commercially available, and are shown in the newspaper. Alternatively, the recommendations are the fund management might be done by a bank.

Another feature of the system herein is that a participant's checks in total cannot clear through the system in excess of the total amount of the insurance policy's deductible in any one year. The insurance company will pay all of the costs over the deductible. Thus for policies of this type, there would be a further internal routine that would, for example in FIG. 1E, within decision box 62, which has the checks written exceeded the deductible for that year on the participant's policy. If no, then statement would go. If yes, the check would be returned 64.

These and other modifications and variations may be made without departing from the scope and spirit of the invention, which is defined in the attached claims.

I claim:

1. A method of operating a computer system for providing health insurance, health payments, and recording keeping for participants comprising the steps of:

entering into a computer a plurality of accounts one for each participant, and with a credit balance of money in each account, opening a custodian account with the money of said accounts, engaging a mutual fund to hold substantially all of said money shown on each account credit balance, and which mutual fund from time to time produces money income, periodically crediting in said computer each of said accounts with its proportional share of the money income accumulated since the last periodic crediting, said proportional share being automatically calculated and being the ratio of each account credit balance divided by the total mutual fund credit balance, establishing an insurance policy for beneficiaries of each account, periodically automatically transferring via a computer money from said custodian account to an insurance company for payment of said insurance policy as said payments become due, and via said computer calculating and debiting each of said accounts for its share of said insurance, to each account holder, vouchers to be used by the beneficiary to pay medical/health expenses not covered by said insurance for the account's beneficiaries, entering and debiting via a computer the appropriate account whenever checks are drawn and presented to the custodian account, and automatically transferring periodically causing a periodic transfer of money between the custodian account and the mutual fund so that a minimum balance is kept in the custodian account at substantially all times and money in excess of said balance is in the mutual fund.

2. The method of claim 1, further comprising the steps of automatically generating and transmitting reports periodically to each participant of the credit balance in said participant's account which is in said mutual fund, any credits from said proportional share of said mutual fund added since an immediately prior periodic report, any checks which cleared said account, including a list of payee, and amount, and if required for that participant's account a notice of amount and due date for additional money to be paid into the account to maintain a required credit balance, and a list of debits including payment of insurance premiums.

3. The method of claim 1 comprising the further steps of receiving applications for new accounts; entering data from each application into the computer, said computer reviewing said new applications for acceptance criteria stored in said computer; automatically generating a non-acceptance notice for any of said new applications which are not acceptable in said review and returning any money received said non-accepted applications; and automatically for each application which is accepted in said review automatically opening a new account; automatically ordering checks for said new account to be sent to a beneficiary of said new account, automatically entering said new account in a commission report, automatically reporting data of said new accounts to the custodian and including at least the account number, automatically adding said accounts beneficiaries in said insurance policy, and automatically generating insurance ID cards for the beneficiary.

4. The method of claim 1, further comprising the steps of periodically entering checks as received in a database of the computer including the amount and if known the name of participant and participant's account number;

automatically comparing said entered checks account number with said accounts;

processing said checks for deposit for each account where said account number comparison matches an active account;

automatically generating a letter of explanation for inclusion with a return of the check if the check is for a cancelled account;

verifying the check is proper if the check is for a new unopened account; and if proper then opening a new account, including enter data of the check into the participant's account for subsequent inclusion in periodic account statement, into a salesman report, into a report to the custodian, and if not proper then generating a letter of explanation, for inclusion with a return of the check;

depositing checks which cannot be matched with any account, and which checks seem proper, and then automatically identifying in a pending file all unmatched checks.

5. The method of claim 4 further comprising the steps of automatically comparing each subsequent new account with said pending file.

6. The method of claim 4 further comprising the steps of generating for each address associated with an unmatched check a new account application file, and transmitting a new account application.

7. The method of claim 6, further comprising the steps of periodically entering in the computer reports received from the custodian of money received by the custodian for accounts, automatically verifying which money is for which active accounts and are proper, and crediting said receipt in said participant's accounts verifying for a new unopened account, and if proper, and then automatically opening said new account and entering data into the participant's account for subsequent inclusion in periodic account statement, in a salesman report, and in report to the custodian, and if not proper automatically generating a letter of explanation and return money to sender entering in the computer a record of any money which cannot be identified with any account, and which seem proper, in a pending file.

8. The method of claim 1, comprising the further steps of periodically receiving requests for name change of participants, requests for address change of participants, and requests for tax information change of participants; verifying that proper documentation supporting the requested change is received, and if not received, automatically generating a request for missing proper documentation; on said request for change of address routinely writing to the old address with notice of change of address and requesting response; and upon receipt of proper documentation, automatically entering the requested change of name, address, or tax information in said participant's account and for inclusion in the next statement of accounts.

9. The method of claim 1, further comprising the steps of entering instructions to close a particular one of said accounts due (a) instructions from the account participant, or (b) cancellation because of insufficient funds to pay insurance premiums, or (c) notice of death of participant and (d) if death notice of participant in family policy a non-election to keep family policy; then automatically verifying balance, including accrued money due said account to be closed; automatically processing a redemption check; and closing said account closed.

10. The method of claim 9 further comprising the step of upon receipt of death notice of a primary participant of a family account, verifying the accuracy of said notice, then offering by automatically generating a document and transmitting same to a surviving family member an option to have an account with its insurance policy, and responding to affirmative reply from surviving family member by automatically issuing a revised policy.

11. The method of claim 1 further comprising the steps of entering in the computer data of each check presented to the custodian for acceptance;

automatically verifying if the balance in the corresponding account of said check would reduce said account below a minimum amount of money therein needed to pay at least the next insurance premium;

automatically generating a signal for generating a refusing and returning the check, for insufficient funds if the account is below said minimum debiting via said computer said corresponding account with the amount of said check, if the account credit balance after said debiting is above said minimum.

12. The method of claim 1, further comprising the steps of sequentially entering requests from participants for an additional supply of checks; automatically verifying that the account for the participant ordering the checks is current; and automatically ordering the checks from a check vendor with instructions to send the checks to the participants.

13. The method of claim 1, further comprising the steps of periodically inputting data into the computer from sales groups who bring in new accounts, including requests for change of insurance agent, insurance agency, change of agent's name, change of agent's address, verifying at least partially with data in said computer that said requests are probably valid, accepting said request for change when said request for change agrees with said verification of probably valid data, and then automatically notifying at least the custodian, and sales group involved in the change of said change; and automatically requesting proper documentation from said sales group requesting said change for each of said requests for change which do not agree with said verification of probably valid data.

14. The method of claim 1 further comprising the steps of periodically, and at least once a month, computer sweeping the accounts and identifying those accounts for which insurance premiums are payable within a first time period and which have sufficient credit balance for said premium payments, and automatically generating from said identified accounts data and then using said data for:
  (a) automatically reporting to the insurance company, that said identified accounts will have premiums paid and including for each such identified account at least the policy number, and name,
  (b) automatically instructing the custodian to transfer money to the insurance company for payment of said premium
  (c) automatically notifying each of said identified accounts, which after payment of said insurance premium will not have sufficient credit balance after a next insurance premium payment which falls due in a second time period, said notifying including a minimum amount due and a first due date.

15. The method of claim 14 further comprising the steps of entering in the computer data of deposits received from participants subsequent to said notifying and prior to said first due dates;

automatically generating and transmitting to each account holder, at or close to said first due date, notice for each account having a notice of insufficient balance, and which has not credited thereto at least said minimum amount due, a warning of policy cancellation comprising for each such account, a second minimum amount due to reach a sufficient balance and a second due date;

entering in the computer data of deposits received from participants between said first and second due dates;

automatically generating and transmitting to each account holder, at or close to said second due date, for each account having a warning of policy cancellation, and which has not credited thereto between said first and second due dates at least said second minimum amount due a notice of policy cancellation, including a date of cancellation.

16. The method of claim 15, further comprising the steps of entering in the computer data of deposits received from participants who have received a notice of policy cancellation, between the date of said second due date, and a grace time period after said date of cancellation; and for those accounts having received a notice of policy cancellation and for which no deposits have been received subsequent to said date of cancellation and said grace period, automatically cancelling the account.

17. The method of claim 1 further comprising the steps of periodically, and at least once a month
   automatically computer reviewing all accounts which are new since a most recent prior review, and
   computer tabulating data on said new accounts and automatically outputting from said data and transmitting
   (a) a first report to the insurance company to add said new accounts,
   (b) a second report with instructions to the custodian to add said new accounts, and
   (c) a third report to sales persons who are credited with said new accounts including identification of said new account, and automatically generating to said sales person a commission payment for said new account.

18. The method of claim 1, further comprising the steps of periodically, and at least once a month,
   automatically crediting each account with that account's portion of dividend from the mutual fund within said period
   then automatically determining if each account has sufficient balance for payment of the next insurance premium;
   and automatically generating and transmitting to each account holder, if said balance is sufficient, statements to said accounts having sufficient balances comprising for each such account, dividends from said fund during the period, checks cleared during the period including check number and amount; and
   and automatically generating and transmitting to each account holder if said balance is insufficient, a warning of insufficient balance to said accounts having insufficient balances, comprising for each such account, the minimum amount due to reach a sufficient balance, and a first date due.

19. The method of claim 18 further comprising the steps of
   entering in the computer data of deposits received from participants subsequent to a date of said crediting and prior to said due dates;
   automatically generating and transmitting to each account holder for each account having a warning of insufficient balance, and which has not credited thereto at least said minimum amount due, a warning of policy cancellation comprising for each such account, a minimum amount due to reach a sufficient balance and a second due date;
   entering in the computer data of deposits received from participants between said first and second due dates;
   automatically generating and transmitting to each account holder for each account having a warning of policy cancellation, and which has not credited therein between said first and second due dates at least said second minimum amount due a notice of policy cancellation.

20. The method of claim 1 further comprising the steps of computer automatically generating periodically, and at least once every three months, an amendment of Health Insurance Policy records comprising the steps of collecting participant's notice of data changes within said period relating to change of marital status and family members;
   automatically outputting said collected data to the insurance company whereby said insurance company may update and confirm its records for participants for whom notices are outputted,
   automatically outputting to participants from whom said notices have been received, responses there to that the notices have been received and collected.

21. The method of claim 1, further comprising the steps of (a) automatically generating periodically, at least once a year, for each participant a detailed statement including credits during the period, insurance premiums paid during the period; medical expenses during the period, and including the checks debited by check number, and amounts; and automatically sending to each participant said detailed statement.

22. The method of claim 21, wherein said generating step further comprising automatically generating annual renewals process data for each participant who is a group.

23. A method for data processing relative to the establishment, processing, maintenance and supervision of a Medical Savings Fund Account ("MSFA"), a financial services product, consisting of a money market mutual fund (which may produce taxable or tax-free dividends) and a health insurance policy purchased by a plurality of customers, including individuals, family groups and other defined groups comprising employers on behalf of their employees, funding said money market mutual fund account to pay for health insurance benefits with systematic premium payments, a checkwriting service for payment of medical expenses up to the amount of the deductible stated in the insurance policy, records provided for tax reporting requirements and possible income tax benefits, said data processing method comprising in a data processing system the steps of:
   establishing an account in a money market mutual fund;
   recording data relative to the issuance and maintenance of a health insurance policy;
   providing a supply of checks (drafts) to be drawn on the money market mutual fund account of the system for payment of medical expenses;
   systematic payment of health insurance premiums when due and payable;
   payment of monthly dividends automatically on average account balance;
   monthly automatic financial status reports to participants;
   notices and reminders automatically when account balances are not sufficient to pay premiums and/or medical expenses; and
   annual statements automatically for general accounting and tax reporting purposes.

24. A system for providing health insurance, and medical/health/tax recording keeping for participants comprising:
   a data base having a plurality of participant's accounts with a credit balance of money in each account, a mutual fund account having a balance of substantially all of said participant's accounts credit balances, and a custodian account having a balance of substantially a difference between said mutual fund account balance and said participant's account credit balances;
   program and computer means for periodically automatically crediting each participant's account with its proportional share of money income accumulated since the last periodic crediting, said proportional share being the ratio of each participant's account credit balance divided by the total mutual fund balance;

program and computer means for periodically automatically transferring money through said custodian account to an insurance company which provides health insurance to beneficiaries of said participant's accounts for payment of an insurance policy as said payments become due, and for debiting each participant's account for its share of said insurance;

program and computer means for automatically issuing to each participant's accounts beneficiaries means for use by the beneficiaries to pay medical/health expenses not covered by said insurance;

computer and program means for debiting the appropriate participant's account whenever said checks are validly drawn and presented; and computer and program means for causing a periodic automatic transferring of money between said custodian account and said mutual fund so that a minimum balance is kept in the custodian account at substantially all times and money in excess of said minimum amount is in said mutual fund account.

* * * * *